Patented Feb. 25, 1947

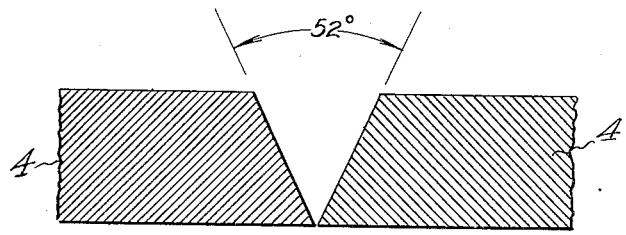
FIG_1_
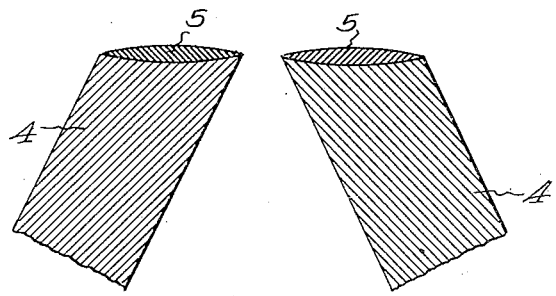
FIG_2_
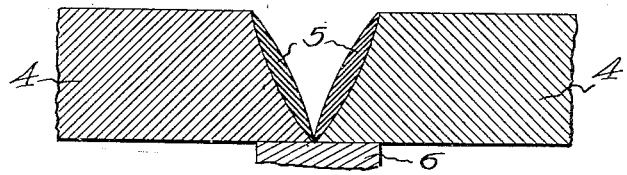
FIG_3_
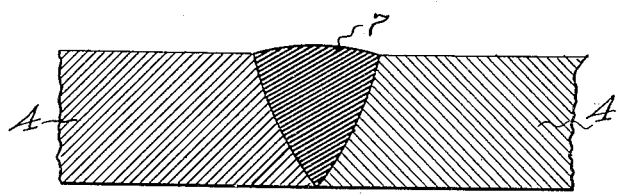
FIG_4_

2,416,379

UNITED STATES PATENT OFFICE 2,416,379

WELDING METHOD

Willi M. Cohn, El Cerrito, Calif.

Application January 7, 1943, Serial No. 471,573

2 Claims. (Cl. 219—10)

My invention relates to the art of welding and more particularly to an improved method of welding whereby welds may be completed at relatively high speeds without certain undesirable results inherent in prior methods.

In welding operations carried out either manually or by what is known as automatic welding, involving the deposition of molten metal, it is customary to utilize means such as the electric arc, gas fuel, and similar heating mediums. In such operations, there have heretofore been inherent certain factors resulting in either deficiencies in the strength of the weld, an unnecessary prolonged procedure for its completion, or both.

For instance, where the deposited metal and the metal of the surfaces to be joined have different melting points, the effect of the heating medium has been to overheat the pieces to be joined, and thus to cause the conduction of heat to a more extensive zone adjacent the weld than is required or desirable. Furthermore, where the deposited metal and the metal of the surfaces to be joined are different in composition, a mutual dilution of these metals takes place, producing an extended intermediate zone having uncontrollable and undesirable characteristics. All of these undesirable results are enhanced where the surfaces upon which metal is to be deposited are relatively large unless the number of passes made is increased according to the surfaces involved, thus increasing the time required for completion of the welding operation.

With reference to the foregoing and other deficiencies inherent in conventional welding operations, it is the primary object of my invention to provide a new and useful welding method which will reduce the time necessarily consumed in welding operations and, particularly, those in which pieces of relatively large size are to be joined.

A further and more specific object of my intion is to provide a welding method in which the penetration of the surfaces to be joined is held at a minimum.

A further and more specific object of my invention is to provide a welding method in which the effect of the welding operation upon metallurgical characteristics of the parts to be joined is minimized.

A further and more specific object of my invention is to make possible the joining by welding, of metals of such different properties that they could not previously be joined by known welding methods.

The manner in which the foregoing, together with other objects and advantages are realized by the employment of my invention, will be best understood from the following description of my novel method and of a specific example of a welding operation utilizing the same, when read with reference to the accompanying drawing, in which:

Figure 1 is a diagrammatic view of work pieces scarfed for a single V butt weld;

Figure 2 is a diagrammatic view of a first coat applied to each of the work pieces;

Figure 3 is a diagrammatic view of the coated work pieces juxtaposed for welding and with a backing up bar in place; and Figure 4 is a diagrammatic view of the completed weld.

In welding operations performed according to the method of my invention, the surfaces to be joined are first coated with a relatively thin layer of metal which is sufficient so that during the final step hereinafter described, the deposited metal will not penetrate beyond this initially applied layer. This layer preferably should completely cover the areas of the surfaces to be joined. These surfaces may form elements of any conventional form of joint such as a butt joint, T joint, lap joint, edge joint, or corner joint and, while I prefer to apply such a coating by welding a bead on each surface to be joined by a single pass of an arc welding electrode, it will be evident to those skilled in the art that such a coating may be applied by any means which will equally strongly bond the coating to each piece to be joined. In the case of extended areas I prefer the use of several adjoining passes each covering a portion of the area.

After the application of the first coat, as above described, the pieces to be joined are juxtaposed, as shown in Figure 3, for welding together, and metal is deposited upon and between the coats previously applied, being joined by welding to these coats but preferably not penetrating beyond them. I prefer to effect such a deposition of the metal by a single pass of an electric arc welding rod either manually or by means of an automatic welding machine. The shield provided by the first coats above described makes my new method the equivalent of one employing a multiplicity of passes so far as the reduction of the penetration and dilution of the pieces to be joined is concerned and cuts down considerably the time which would be required in an equivalent multiple pass operation. An additional advantage of my new method is found in the fact that the metal deposited during the passes of the first coats tends to be annealed by succeeding passes.

The metal coating applied to the pieces to be joined need not be of the same material as either of the pieces to be joined or as the metal employed to weld the pieces together. In fact where pieces having different coefficients of expansion and/or different metallurgical characteristics are to be welded together, or where a material is to be employed in the final joining step which has a coefficient of expansion and/or metallurgical characteristics markedly different from that of either of the pieces to be joined, it is desirable to select material for the first coat having a coefficient of expansion and metallurgical characteristics intermediate the coefficients of expansion and metallurgical characteristics of the materials which will be joined to said first coats.

If necessary a plurality of superimposed coatings of successively differing coefficients of expansion and/or successively differing metallurgical properties and/or different metals may be interposed in my welding method.

The application of the first coat by arc welding as above described, or by any other convenient means, can readily be effected with but little penetration of the surfaces to be joined as compared with the much greater penetration which would be effected were the surface welded to another by a single pass. An additional advantage of the method of my invention is found in the fact that it is quite feasible to heat treat the pieces to be joined after the first coat above described has been applied to them, thus relieving all possible stresses that may have been built up between the applied coats and the pieces.

As a specific example of the application of the method of my invention, I have shown diagrammatically in the accompanying drawings a welding operation upon one inch armor plate scarfed as shown in Figure 1 for joining by a single V butt joint having a solid angle of 52°. Utilizing a stainless steel electrode of ¼" diameter containing about 18% chromium and 8% nickel, and a powdered flux, the first coat was applied to each piece 4 in the form of a bead 5 (Figure 2) by a single pass at a speed of approximately 25 inches per minute employing a welding current of 550 amperes at 45 volts, and the observed penetration of the work was thus held to a depth of the order of one-sixteenth of an inch.

The pieces were then juxtaposed for joining, as illustrated in Figure 3, employing a conventional backing or chill bar 6, and the final weld 7 (Figure 4) was formed by a single pass at a speed of approximately 22 inches per minute, employing a welding current of 1100 amperes at 30 volts. The observed penetration did not exceed the thickness of the first coats 5, and the joint was satisfactorily completed at a rate far exceeding any speed attainable by methods heretofore employed.

While I have disclosed a specific example of a method of welding embodying my invention, it will be understood that variations in the procedure described will readily occur to those skilled in the art and that the invention therefore should not be regarded as restricted except as required by the prior art and the scope of the appended claims.

I claim:

1. The method of welding together a plurality of metals having different metallurgical characteristics such as chemical compositions, melting points, hardenability, or the like, comprising the steps of welding to surfaces of each of said metals, by electric arc deposition thereon, a coating of a metal having corresponding metallurgical characteristics which are intermediate the metallurgical characteristics of said metals, limiting the rate of such deposition to that sufficient to provide coatings of substantially the minimum thickness which is capable of preventing penetration of said surfaces beyond the depth of penetration effected in applying said coatings, by electric arc deposition of metal on said coatings at a rate in excess of the rate of deposition of said coatings, and then joining said surfaces by electric arc deposition of metal on said coatings at any rate in excess of the rate of deposition of said coatings but insufficient to penetrate said surfaces beyond the depth of penetration effected in applying said coatings.

2. The method of welding together a plurality of metals having different coefficients of expansion comprising the steps of welding to surfaces of each of said metals, by electric arc deposition thereon, a coating of a metal having a coefficient of expansion intermediate the coefficients of expansion of said metals, limiting the rate of such deposition to that sufficient to provide coatings of substantially the minimum thickness which is capable of preventing penetration of said surfaces beyond the depth of penetration effected in applying said coatings, by electric arc deposition of metal on said coatings at a rate in excess of the rate of deposition of said coatings, and then joining said surfaces by electric arc deposition of metal on said coatings at any rate in excess of the rate of deposition of said coatings but insufficient to penetrate said surfaces beyond the depth of penetration effected in applying said coatings.

WILLI M. COHN.

REFERENCES CITED

The following references are of record in the file of this patent:

UNITED STATES PATENTS

| Number | Name | Date |
|---|---|---|
| 2,233,455 | Larson | Mar. 4, 1941 |
| 1,108,592 | Lincoln | Aug. 25, 1914 |
| 2,122,994 | Southgate | July 5, 1938 |
| 1,660,246 | Wille | Feb. 21, 1928 |